(12) United States Patent
Tisch et al.

(10) Patent No.: US 10,522,129 B2
(45) Date of Patent: Dec. 31, 2019

(54) ACTIVE ACOUSTIC AND VIBRATION NOISE CANCELING IN WATERPROOF CAMERA

(71) Applicant: GoPro, Inc., San Mateo, CA (US)

(72) Inventors: Erich Tisch, San Francisco, CA (US); Fabrice Barbier, San Carlos, CA (US); Magnus Hansson, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 147 days.

(21) Appl. No.: 15/726,320

(22) Filed: Oct. 5, 2017

(65) Prior Publication Data

US 2018/0102123 A1 Apr. 12, 2018

Related U.S. Application Data

(60) Provisional application No. 62/405,047, filed on Oct. 6, 2016.

(51) Int. Cl.
*H04N 5/225* (2006.01)
*G10K 11/178* (2006.01)
*H04R 1/08* (2006.01)
*H04R 1/28* (2006.01)

(52) U.S. Cl.
CPC ......... *G10K 11/178* (2013.01); *H04N 5/2252* (2013.01); *H04R 1/08* (2013.01); *H04R 1/2869* (2013.01); *G10K 2210/129* (2013.01)

(58) Field of Classification Search
CPC .......................................... H04N 5/225–2254
USPC ....................................... 348/81, 231.4, 374
See application file for complete search history.

(56) References Cited

U.S. PATENT DOCUMENTS

| 2003/0161484 | A1* | 8/2003 | Kanamori | H04R 3/005 381/71.7 |
| 2012/0275614 | A1* | 11/2012 | Kobayashi | H04R 3/005 381/71.5 |
| 2014/0185853 | A1* | 7/2014 | Aihara | H04R 1/086 381/334 |
| 2015/0023523 | A1* | 1/2015 | Elian | H04R 1/083 381/91 |
| 2017/0303043 | A1* | 10/2017 | Young | H04R 5/027 |

* cited by examiner

*Primary Examiner* — Anthony J Daniels
(74) *Attorney, Agent, or Firm* — Young Basile Hanlon & MacFarlane, P.C.

(57) ABSTRACT

A camera includes one or more microphone pairs. A first microphone (e.g., a main microphone) is ported to the outside of the camera and captures the desired external audio signal, but may also capture undesired vibrational noise. A second microphone has a similar structure to the first microphone, but is not ported to the outside of the camera. Instead, the second microphone is ported into an enclosed cavity (e.g., 1-2 cubic centimeters in volume). The second microphone may pick up the same vibration excitation and internal acoustic noise as the first microphone but very little of the desired external acoustic sounds around the camera. The unwanted noise can then be removed by subtracting the second audio signal from the second microphone from the main audio signal from the main microphone.

19 Claims, 3 Drawing Sheets

US 10,522,129 B2

ACTIVE ACOUSTIC AND VIBRATION NOISE CANCELING IN WATERPROOF CAMERA

RELATED APPLICATIONS

This application claims the benefit of U.S. Provisional Application No. 62/405,047 filed on Oct. 6, 2016 which is incorporated by reference herein.

BACKGROUND

Field of Art

The disclosure generally relates to audio systems and in particular to canceling vibration noise in a camera.

Description of Art

In a waterproof camera, a protective membrane may be placed in front of the microphone to prevent water from entering the camera. When the camera moves or external forces are applied to the camera, the membrane may vibrate. The vibrations may be picked up as acoustic noise by the microphone. Additionally, other vibrating components inside the camera may generate additional noise that may reach the microphone. This noise is generally undesirable and may reduce the quality of desired audio signal.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
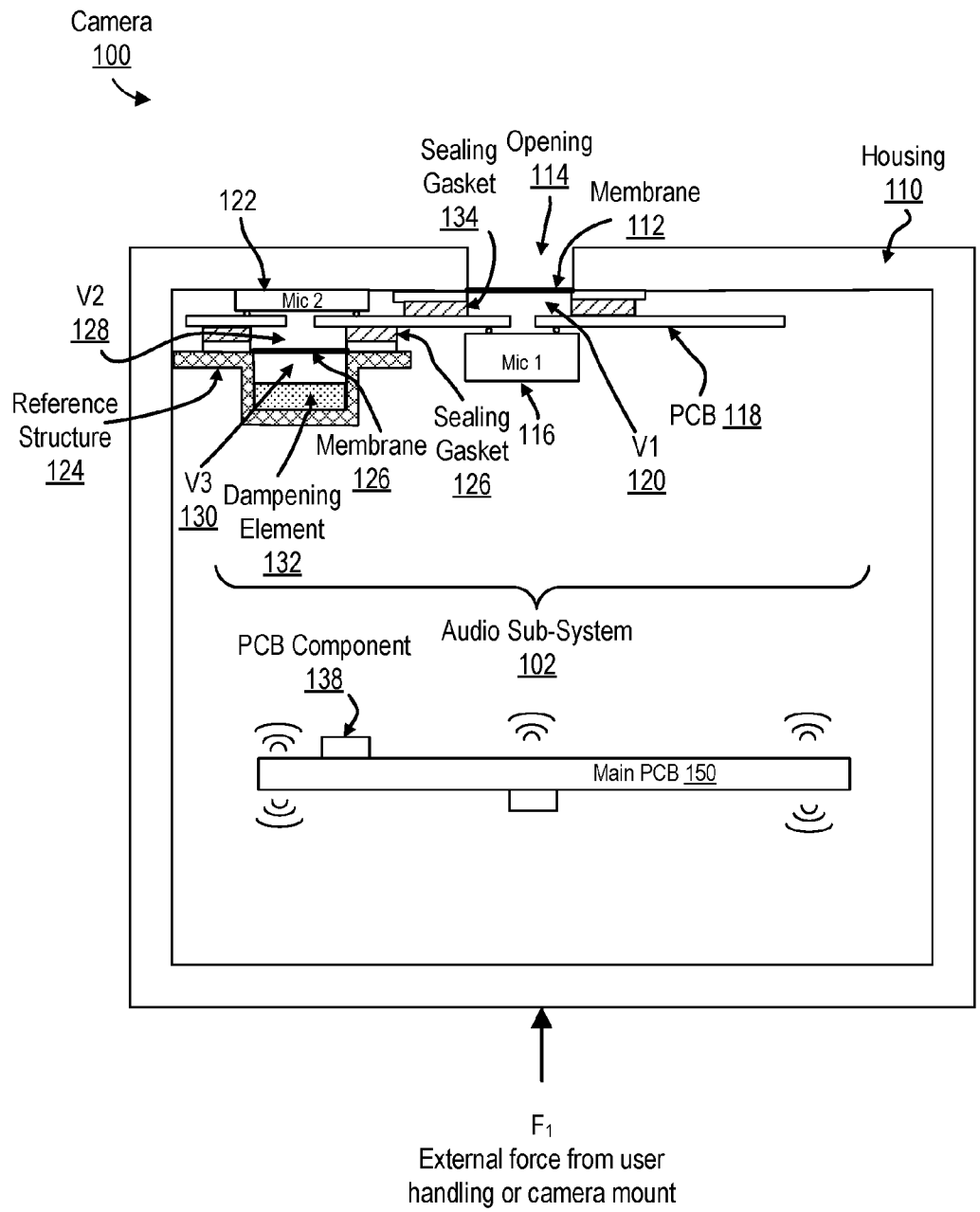
FIG. 1 is a block diagram illustrating an example embodiment of an audio sub-system of a camera.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

CONFIGURATION OVERVIEW

In an embodiment, a camera includes one or more microphone pairs. A first microphone (e.g., a main microphone) is ported to the outside of the camera and captures the desired external audio signal, but may also capture undesired vibrational noise. A second microphone has a similar structure to the first microphone, but is not ported to the outside of the camera. Instead, the second microphone is ported into an enclosed cavity (e.g., 1-2 cubic centimeters in volume). The second microphone may pick up the same vibration excitation and internal acoustic noise as the first microphone but very little of the desired external acoustic sounds around the camera. The unwanted noise can then be removed by subtracting the second audio signal from the second microphone from the main audio signal from the main microphone.

In a particular embodiment, a camera or other audio capture device includes an audio sub-system that includes structures for enabling noise cancellation. A housing has a microphone port comprising an opening. A first waterproof membrane spans the opening. A printed circuit board is coupled to an interior surface of the housing below the microphone port. The printed circuit board comprises a main microphone opening under the microphone port and a reference microphone opening laterally offset from the microphone port. A main microphone is mounted to a bottom surface of the printed circuit board below the main microphone opening. The main microphone detects ambient audio and generates a main audio signal. A reference microphone is mounted to a top surface of the printed circuit board above the reference microphone opening. The reference microphone captures a reference audio signal. A second waterproof membrane spans the reference microphone opening. A reference structure is configured such that a reference cavity exists below the second waterproof membrane. One or more sealing gaskets isolates the second microphone from the microphone port. A processor (e.g., by subtracting the reference audio signal from the main audio signal).

Audio Sub-System Architecture

FIG. 1 illustrates a cross-sectional view of an embodiment of an audio sub-system 102 of a camera 100. The camera 100 comprises a housing 110 with an opening 114 (e.g., a main microphone port) in a top surface of the housing 110 sealed by a waterproof membrane 112. The waterproof membrane 112 covers a main microphone (Mic 1) 116 that is mounted to a bottom surface of an audio printed circuit board (PCB) 118 on an opposite side of the audio PCB 118 from the member 112. The waterproof membrane 112 prevents water from reaching the main microphone 116 but enables acoustic waves to reach the main microphone 116 so that the main microphone 116 can capture the ambient audio without substantial distortion. The audio PCB 118 may include additional electronics supporting the audio sub-system 102 such as an audio processor, memory, storage, and interconnections between the components. The audio PCB 118 may include an opening aligned with the opening 114 in the housing 110 to enable ambient audio to reach the main microphone 116. In an embodiment, the audio PCB 118 and the attached main microphone 116 are attached to the housing 110 via an elastomer and sealant. A first acoustical cavity (V1) 120 is formed between the main microphone 116 and the membrane 112.

A reference microphone (Mic 2) 122 is mounted at a different position on the audio PCB 118. For example, the reference microphone 122 may be mounted on a top surface of the audio PCB 118 (e.g., on the side facing the membrane 112) and may also be coupled to an interior surface of the housing 110. The bottom surface of the audio PCB 118 below the reference microphone 122 may attach to a reference structure 124 cantilevered from an interior side surface (e.g., perpendicular to the top surface) of the housing 110. The reference structure 124 may include a waterproof membrane 126 below an opening of the PCB audio 118 below the second microphone 122. The waterproof membrane 126 may be substantially similar in material and thickness to the waterproof membrane 112 such that it produces a similar or vibrational response in response to the same input stimulus.

In an embodiment, the reference structure 124 is attached to the bottom surface of the audio PCB 118 via an elastomer and sealant each having similar structural and material characteristics to the elastomer and sealant used to attach the main microphone 116 to the housing 110. A second acoustical cavity (V2) 128 is formed between the reference microphone 122 and the second membrane 126. This second acoustical cavity 128 may have substantially the same characteristics as the first acoustical cavity 120 (e.g., similar shape, volume, and acoustic characteristics). A reference cavity 130 having a volume V3 is also formed below the membrane 126 and above the cantilever reference structure 124. The volume V3 may be dampened by a dampening element 132.

FIG. 1 also illustrates sealing gaskets 134 between the top surface of the PCB 118 and the interior surface of the housing 110 on either side of the opening 114 in order to isolate the first acoustical cavity 120. Similar gaskets 136 may be placed on the sides of the second acoustical cavity 128 to similarly isolate the second acoustical cavity 128. The gaskets 134, 126 may comprise ring-shaped gaskets with openings that align with the main microphone opening and the reference microphone opening respectively in the PCB 118. The gaskets 134, 126 substantially isolate the reference microphone from the opening 114. Furthermore, the gaskets 134, 126 substantially acoustically isolate the first acoustical cavity and the second acoustical cavity.

FIG. 1 further illustrates a main PCB 150. The main PCB 150 may include various electronic components that support general functionality such as, for example, an image sensor, video processor, memory controller, or other supporting components. The main PCB 150 may include various components 138 (e.g., integrated circuits or other surface mount components) that may generate vibrational forces resulting in vibrational noise inside the housing 110. These vibrations may occur in response to external forces $F_1$ acting on the housing 110 caused by, for example, a user handling the camera, a mount attached to the camera that exerts a force on the camera in response to motion, or other external forces.

As can be seen from FIG. 1, the reference microphone 122 is isolated from the external audio source that will be captured by the main microphone 116. However, the reference microphone 122 and the main microphone 116 will both pick up similar vibrational noise because the respective microphone 116, 122, acoustical cavities 120, 128, and membranes 112, 126 are similar positioned and structured. Furthermore, both microphones 116, 122 are affixed to the same PCB 118 and therefore pick up similar vibrations from the PCB 118. The reference cavity 130 and the dampening element 132 within it may also be structured in a manner that causes the reference microphone 122 to capture similar vibrational noise (e.g., frequency and amplitude as the main microphone 116. Alternatively, the structure of the reference cavity 130 and dampening element 132 can characterize a baseline noise that can enable a signal processor to estimate the vibrational noise that will be captured by the main microphone 116. The audio signal from the reference microphone 122 (or a transformation thereof) can be subtracted from the main audio signal from the main microphone 116 to improve the signal-to-noise ratio of the audio signal.

Figure 2:
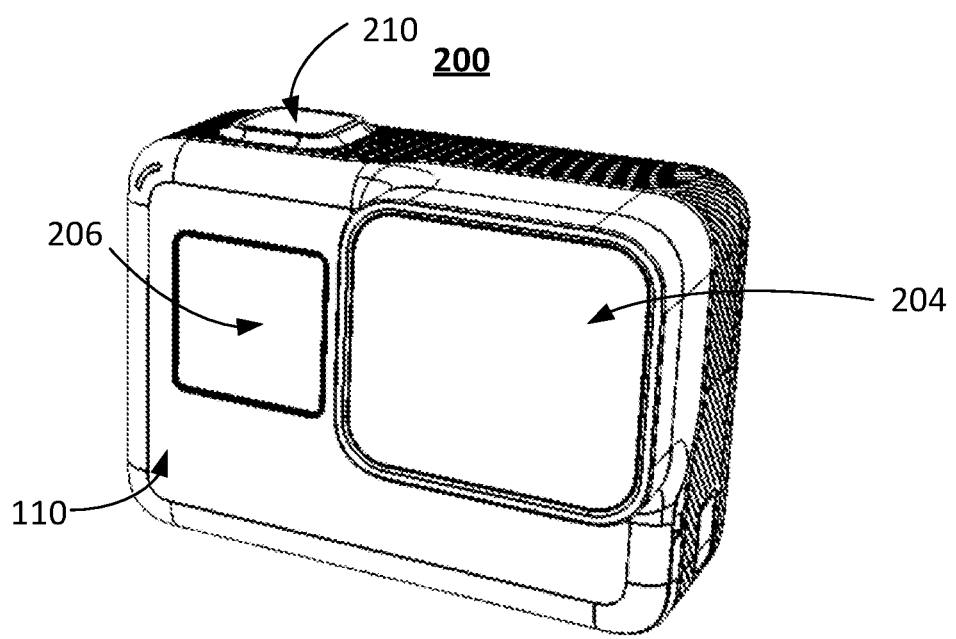
FIG. 2 is an example embodiment of a camera.

FIG. 2 illustrate an embodiment of an example camera 200 that may include the audio sub-system 102. The camera 200 may comprise a housing 110 having a camera lens 204 structured on a front surface of the housing, various indicators on the front of the surface of the housing 202 (such as LEDs, a display 206, and the like), various input mechanisms (such as buttons, switches, and touch-screen mechanisms), and electronics (e.g., imaging electronics, power electronics, etc.) internal to the housing 202 for capturing images via the camera lens and/or performing other functions. The camera 200 may be configured to capture images and video, and to store captured images and video for subsequent display or playback.

The camera 200 can include various indicators, including a display panel 206. The camera 200 can also include buttons 210 configured to allow a user of the camera to interact with the camera, to turn the camera on, and to otherwise configure the operating mode of the camera. The camera 200 can also include one or more audio sub-systems 102 which may each have the structure described above.

Figure 3:
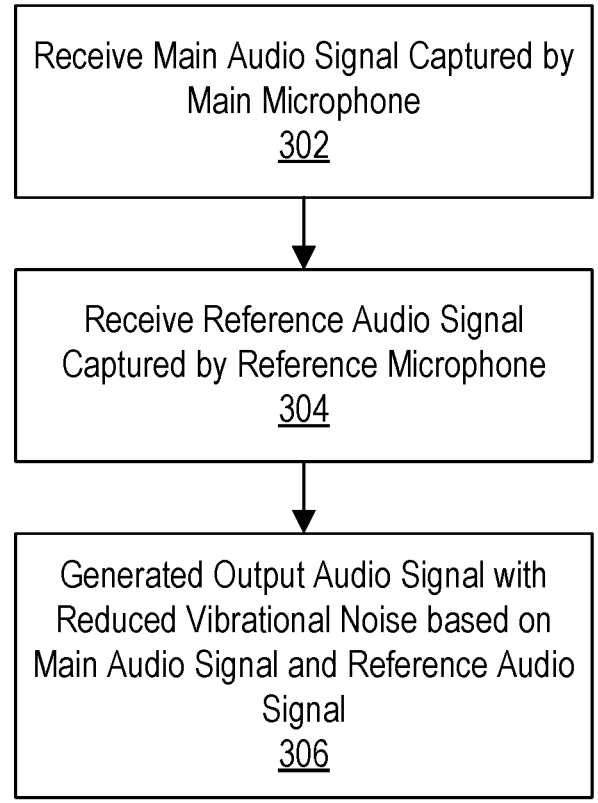
FIG. 3 is a flowchart illustrating an example process for processing an audio signal in a camera.

FIG. 3 is a flowchart illustrating an example embodiment of a process for processing an audio signal. A main audio signal captured by the main microphone is received 302 by a processor. A reference audio signal captured by the reference microphone is also received 304 at the processor. An output audio signal is generated 306 based on the main audio signal and the reference audio signal that has reduced vibrational noise relative to the main audio signal. For example, the output audio signal may be generated by subtracting the reference audio signal from the main audio signal. Alternatively, a predefined transformation may be applied to the reference audio signal to generate a transformed referenced audio signal, and the output audio signal is then generated by subtracting the transformed referenced audio signal from the main audio signal. Here, the transformation may be predetermined based on a characterization of the noise captured by the reference audio signal relative to the main audio signal, which may relate to the physical properties of the reference cavity 130 and dampening element 132.

In an alternative embodiment, the audio sub-system 102 of FIG. 1, may be integrated into an audio capture device that is not necessarily a camera. Here, the various components discussed in FIG. 1 may be integrated with a device housing of the audio capture device in the same manner that they are integrated into the housing described above.

ADDITIONAL CONFIGURATION CONSIDERATIONS

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a drainage path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera comprising:
a housing having a microphone port comprising an opening in the housing;
a first waterproof membrane spanning the opening in the housing;
a printed circuit board coupled to an interior surface of the housing below the microphone port, the printed circuit board comprising a main microphone opening under the microphone port and a reference microphone opening laterally offset from the microphone port;
a main microphone mounted to a bottom surface of the printed circuit board below the main microphone opening, the main microphone for detecting ambient audio and generating a main audio signal;
a reference microphone mounted to a top surface of the printed circuit board above the reference microphone opening, the reference microphone to capture a reference audio signal;
a second waterproof membrane spanning the reference microphone opening;
a reference structure configured such that a reference cavity exists below the second waterproof membrane;
one or more sealing gaskets to isolate the second microphone from the microphone port; and
a processor to generate an output audio signal based on the main audio signal and the reference audio signal.

2. The camera of claim 1, wherein the reference structure comprises:
a dampening element below the reference cavity to dampen vibrations experienced by the reference structure.

3. The camera of claim 1, wherein the one or more sealing gaskets comprise:
a first gasket between an interior surface of the housing and a top surface of the printed circuit board, the first gasket having an opening aligned with the main microphone opening; and
a second gasket between a bottom surface of the printed circuit board and a tope top surface of the reference structure, the second gasket having an opening aligned with the reference microphone opening.

4. The camera of claim 3, wherein a first acoustical cavity exists in the opening of the first gasket above the main microphone, below the first waterproof membrane, and wherein a second acoustical cavity exists in the opening of the second gasket below the reference microphone, above the second waterproof membrane.

5. The camera of claim 4, wherein the first acoustical cavity and the second acoustical cavity exhibit a substantially same acoustical response to vibrations.

6. The camera of claim 4, wherein the first acoustical cavity and the second acoustical cavity have approximately a same volume.

7. The camera of claim 1, wherein the reference structure comprises:
a cantilever structure coupled to an interior side face of the housing perpendicular to a top face including the microphone port.

8. The camera of claim 1, wherein the processor is configured to generate the output audio signal by subtracting the reference audio signal from the main audio signal.

9. The camera of claim 1, wherein the processor is configured to generate the output audio signal by applying a transformation to the reference audio signal to generate a transformed reference audio signal and subtracting the transformed reference audio signal from the main audio signal.

10. An audio device comprising:
a device body having a microphone port comprising an opening in the device body;
a first waterproof membrane spanning the opening in the device body;
a printed circuit board coupled to an interior surface of the device body below the microphone port, the printed circuit board comprising a main microphone opening under the microphone port and a reference microphone opening laterally offset from the microphone port;
a main microphone mounted to a bottom surface of the printed circuit board below the main microphone opening, the main microphone for detecting ambient audio and generating a main audio signal;
a reference microphone mounted to a top surface of the printed circuit board above the reference microphone opening, the reference microphone to capture a reference audio signal;
a second waterproof membrane spanning the reference microphone opening;
a reference structure configured such that a reference cavity exists below the second waterproof membrane;
one or more sealing gaskets to isolate the second microphone from the microphone port; and
a processor to generate an output audio signal based on the main audio signal and the reference audio signal.

11. The audio device of claim 10, wherein the reference structure comprises:
a dampening element below the reference cavity to dampen vibrations experienced by the reference structure.

12. The audio device of claim 10, wherein the one or more sealing gaskets comprise:
a first gasket between an interior surface of the device body and a top surface of the printed circuit board, the first gasket having an opening aligned with the main microphone opening; and a second gasket between a bottom surface of the printed circuit board and a top surface of the reference structure, the second gasket having an opening aligned with the reference microphone opening.

13. The audio device of claim 12, wherein a first acoustical cavity exists in the opening of the first gasket above the main microphone, below the first waterproof membrane, and wherein a second acoustical cavity exists in the opening of the second gasket below the reference microphone, above the second waterproof membrane.

14. The audio device of claim 13, wherein the first acoustical cavity and the second acoustical cavity exhibit a substantially same acoustical response to vibrations.

15. The audio device of claim 13, wherein the first acoustical cavity and the second acoustical cavity have approximately a same volume.

16. The audio device of claim 10, wherein the reference structure comprises:
a cantilever structure coupled to an interior side face of the housing perpendicular to a top face including the microphone port.

17. The audio device of claim 10, wherein the processor is configured to generate the output audio signal by subtracting the reference audio signal from the main audio signal.

18. The audio device of claim 10, wherein the processor is configured to generate the output audio signal by applying a transformation to the reference audio signal to generate a transformed reference audio signal and subtracting the transformed reference audio signal from the main audio signal.

19. A camera comprising:
a housing having a microphone port comprising an opening in the housing;
a printed circuit board;
a main microphone to detect a main audio signal based on ambient audio entering the microphone port and vibration noise generated by components of the camera, the main microphone mounted to a first surface of the printed circuit board;
a first waterproof membrane spanning a first acoustical cavity adjacent to the main microphone;
a reference microphone substantially acoustically isolated from the microphone port, the reference microphone capturing a reference audio signal based on the vibration noise generated by the components of the camera, the reference microphone mounted to a second surface of the printed circuit board;
a second waterproof membrane spanning a second acoustical cavity adjacent to the reference microphone;
one or more sealing gaskets to isolate the second acoustical cavity from the first acoustical cavity; and
a processor to generate an output audio signal based on the main audio signal and the reference audio signal.

* * * * *